(12) United States Patent
Grot et al.

(10) Patent No.: US 7,255,798 B2
(45) Date of Patent: Aug. 14, 2007

(54) RECYCLING OF USED PERFLUOROSULFONIC ACID MEMBRANES

(75) Inventors: Stephen Grot, Middletown, DE (US); Walther Grot, Chadds Ford, PA (US)

(73) Assignee: Ion Power, Inc., New Castle, DE (US)

( * ) Notice: Subject to any disclaimer, the term of this patent is extended or adjusted under 35 U.S.C. 154(b) by 68 days.

(21) Appl. No.: 11/089,547

(22) Filed: Mar. 24, 2005

(65) Prior Publication Data
US 2005/0211630 A1 Sep. 29, 2005

Related U.S. Application Data

(60) Provisional application No. 60/556,916, filed on Mar. 26, 2004.

(51) Int. Cl.
B01D 37/00 (2006.01)
C22B 11/00 (2006.01)
(52) U.S. Cl. .......................... 210/773; 210/774; 423/22; 423/17; 423/20; 423/49; 588/407
(58) Field of Classification Search ................. 210/773
See application file for complete search history.

(56) References Cited

U.S. PATENT DOCUMENTS

| | | | | |
|---|---|---|---|---|
| 2,710,799 | A | * | 6/1955 | Leopard ........................ 75/715 |
| 3,060,162 | A | * | 10/1962 | van den Berg et al. ..... 528/496 |
| 3,309,518 | A | * | 3/1967 | Weiss ........................... 378/45 |
| 3,853,755 | A | * | 12/1974 | Ganci .......................... 210/654 |
| 4,266,036 | A | * | 5/1981 | Baczek et al. ................. 521/26 |
| 4,433,082 | A | | 2/1984 | Grot |
| 4,434,116 | A | * | 2/1984 | Covitch ........................ 264/49 |
| 4,453,991 | A | | 6/1984 | Grot |
| 4,526,904 | A | * | 7/1985 | Kishida et al. ................ 521/26 |
| 4,687,755 | A | * | 8/1987 | Green ......................... 502/159 |
| 4,762,952 | A | * | 8/1988 | Green ......................... 568/678 |
| 4,775,452 | A | * | 10/1988 | Kuninaga et al. ............ 205/348 |
| 5,133,843 | A | * | 7/1992 | Eisman ....................... 205/559 |
| 5,393,388 | A | * | 2/1995 | Herrmann et al. ........... 205/559 |
| 5,393,389 | A | * | 2/1995 | Herrmann et al. ........... 205/559 |
| 5,423,957 | A | * | 6/1995 | Herrmann et al. ........... 205/622 |
| 5,431,823 | A | * | 7/1995 | Gofer .......................... 210/636 |
| 5,436,086 | A | * | 7/1995 | Seymour et al. .............. 429/17 |
| 5,498,321 | A | * | 3/1996 | Arnold et al. ............... 205/525 |
| 5,718,984 | A | * | 2/1998 | Iwase et al. ................... 429/49 |

(Continued)

FOREIGN PATENT DOCUMENTS

JP 2003026650 A * 1/2003
WO WO 192383 A1 * 12/2001

OTHER PUBLICATIONS

Nafion(Reg. TM) from http://en.wikipedia.org/wiki/Nafion; 5 pages.*

(Continued)

Primary Examiner—Robert James Popovics
(74) Attorney, Agent, or Firm—Vinson & Elkins LLP

(57) ABSTRACT

A method for recovering and recycling catalyst coated fuel cell membranes includes dissolving the used membranes in water and solvent, heating the dissolved membranes under pressure and separating the components. Active membranes are produced from the recycled materials.

23 Claims, 1 Drawing Sheet

U.S. PATENT DOCUMENTS

| | | | | |
|---|---|---|---|---|
| 5,755,951 | A * | 5/1998 | Kroner et al. | 205/525 |
| 5,779,763 | A * | 7/1998 | Pinnau et al. | 95/39 |
| 5,840,643 | A * | 11/1998 | Park et al. | 502/25 |
| 5,876,785 | A * | 3/1999 | Kroner et al. | 422/58 |
| 5,899,393 | A * | 5/1999 | Kroner et al. | 241/21 |
| 5,955,394 | A * | 9/1999 | Kelly | 502/12 |
| 6,214,190 | B1 * | 4/2001 | Fache et al. | 204/529 |
| 6,793,799 | B2 * | 9/2004 | Ozawa et al. | 205/559 |
| 2003/0099322 | A1 * | 5/2003 | Ozawa et al. | 376/324 |
| 2004/0121210 | A1 * | 6/2004 | Hamrock et al. | 429/33 |
| 2005/0211630 | A1 * | 9/2005 | Grot et al. | 210/634 |
| 2006/0144791 | A1 * | 7/2006 | Debe et al. | 210/651 |
| 2006/0147791 | A1 * | 7/2006 | Debe et al. | 429/49 |
| 2006/0183006 | A1 * | 8/2006 | Liu et al. | 429/13 |

OTHER PUBLICATIONS

Nafion(Reg. TM) Physical and Chemical Properties; from: http://www.permapure.com/TechNotes/Nafion%20physical%20&%20chemical.htm; 3 pages.*

"Safe Handling and Use of Perfluorosulfonic Acid;" from http://www.dupont.com/fuelcells/pdf/dfc301.pdf; 3 pages.*

Benson, M., et al. (2000). "The Recovery Mechanism of Platinum Group Metals from Catalytic Converters in Spent Automotive Exhaut Systems." *Resources, Conservation and Recycling*, 31, 1.

Bhakta, P. N. H. (1994). "Recent Technology and Trends in Automotive Recycling." *J. Met.*, Feb., 36.

Gebel, G. (2000). "Structural Evolution of Water Swollen Perfluorosulfonated Ionomers from Dry Membrane to Solution." *Polymer*, 41, 5829-5838.

Handley, C., et al. (2002). "Impact of the European Union Vechicle Waste Directive on End-of-Life Options for Polymer Electrolyte Fuel Cells." *J. Power Sources*, 106, 344.

Hoffmann, J. E. (1988). "Recovering Platinum-Group Metals from Auto Catalysts." *Journal of Metals* (June), 40.

Wernick, I. K, and Themelis, N. J. (1998). "Recycling Metals for the Environment." *Ann. Rev. Energy Environ.*, 23, 465.

* cited by examiner

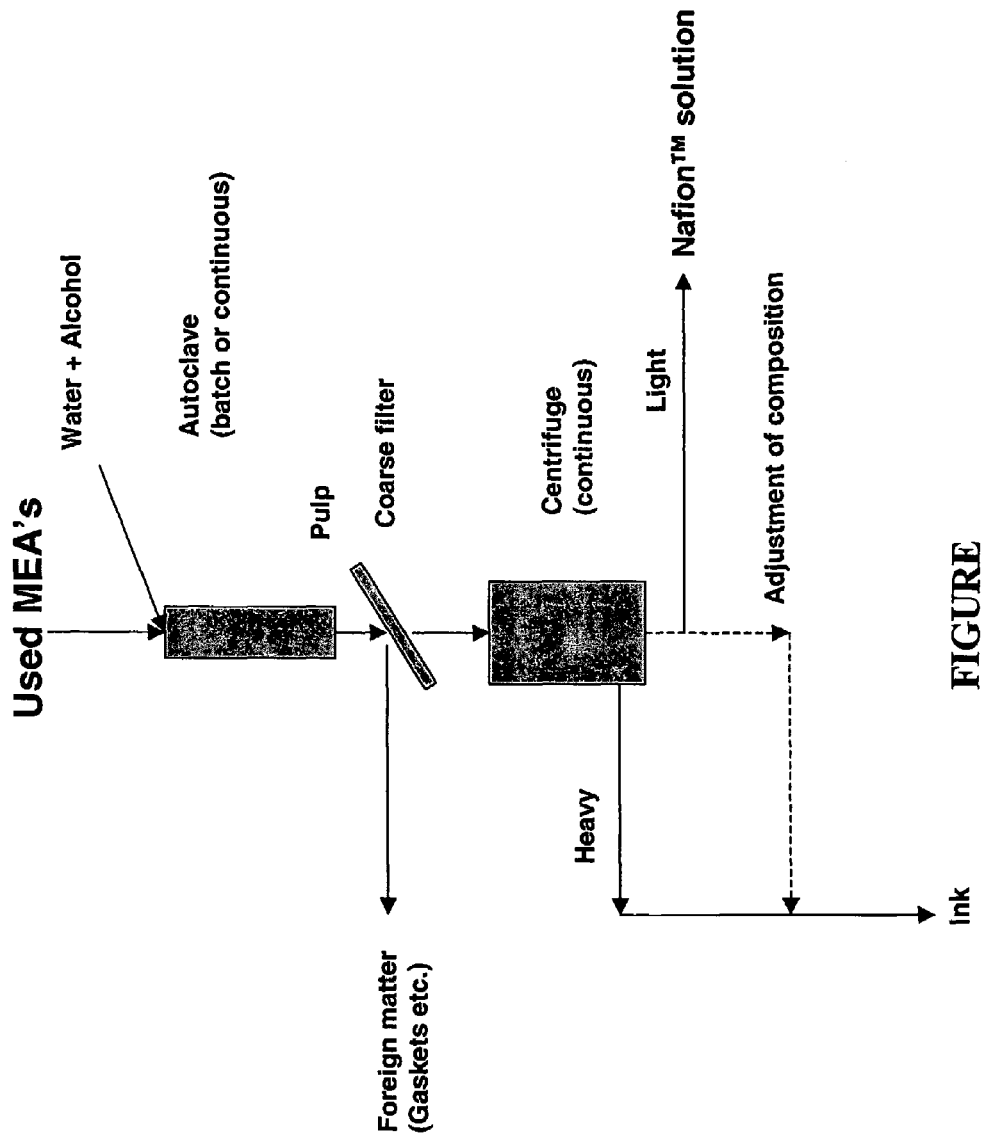

RECYCLING OF USED PERFLUOROSULFONIC ACID MEMBRANES

CROSS REFERENCE TO RELATED APPLICATIONS

This application claims benefit of priority to U.S. Provisional Application Ser. No. 60/556,916, filed Mar. 26, 2004, which is incorporated herein in its entirety by reference.

STATEMENT REGARDING FEDERALLY SPONSORED RESEARCH OR DEVELOPMENT

The work that led to this disclosure was supported, at least in part, by Grant No. DE-FC36-03GO13105 from the United States Department of Energy. The Government has certain rights in inventions disclosed herein.

BACKGROUND OF THE INVENTION

It is believed that over the next few decades many of the currently used power sources, such as internal combustion engines in automobiles will be replaced by polymer electrolyte membrane fuel cells (PEMFC's). In order to make these technologies cost effective, and also to meet recycling and reuse standards such as those set by the European Union for vehicle waste, recycling and reuse of the fuel cell materials is essential. (Handley et al., 2002).

Conventional technologies for platinum group metal (PGM) recovery are based on acid dissolution of the PGMs, or a high temperature melt alloying process. The temperatures used sometimes exceed 2000° C. and the methods are thus energy intensive. The above process is most widely applied in the recycling of precious metals from internal combustion engine exhaust gas catalytic converters (Barnes et al, *Chemistry and Industry* 151, (Mar. 6, 1982); Benson et al., *Resources, Conservation and Recycling,* 31,1, (2000); Bhakta *J. Met.,* 36 (February, 1994); Hageluken *Metall,* 55, 104 (March, 2001); Hoffmann *Journal of Metals,* 40 (June, 1988); Wernick et al., *Ann. Rev. Energy Environ.,* 23, 465, (1998)). Although this recycling technology may be applicable to the recycling of certain fuel processor catalytic components, it is ill suited for PGM recovery from catalyst coated membranes (CCM).

Perfluorosulfonic acid polymer (PFSA) membranes are the most frequently used membrane in the PEM fuel cells. Commercially available polymers include NAFION® marketed by Dupont. The presence of the PFSA, which results in contamination of the high temperature furnace equipment unless expensive HF scrubbing equipment is added, is a major technical limitation in the recycling and reuse of the fuel cell materials. In fact one of the largest reactors in the U.S. is located in the Engelhard facility and is capable of handling at most 10 lbs/hour of perfluoronated polymer material. In Japan the largest PGM recycling facility operated by Tanaka for recycling is based on the Rose process, which cannot tolerate the presence of any F containing material. Regarding hydrometallurgy, the presence of the PFSA™ may block access of the reagent to the Pt sites, thus resulting in poor yields of metal recovery.

Recycling of used perfluorosulfonic acid membranes such as NAFION® from the Chlor-alkali industry also represents a significant source of low cost polymer at the current time. In fact several 10's of thousands of kilograms are sent to landfills annually. The recovery of these materials would allow for a lower cost source of polymer than is currently available.

SUMMARY

The present disclosure addresses at least some of the shortcomings of the prior art by providing technology for the recycling and/or re-manufacture of catalyst coated fuel cell membranes and catalyst-coated fuel processing components that are used in fuel cell systems. A novel feature is the recovery of the active ionomer as well as the precious metals. Currently platinum is the most viable catalyst for PEM fuel cells systems. However, if the potential of this technology is to be realized, the long-term availability of precious group metals may become a serious limitation. With increasing platinum consumption, reserves are depleted, which increases the cost of fuel cells. Hence, platinum recycling is critical to the long-term economic sustainability of PEM fuel cells. In addition, the value of the ionomer component in catalyst-coated membranes currently exceeds that of the precious metals and thus, recovery of the ionomer is also warranted. Future cost estimates using projected annual fuel cell vehicle production volumes of 500,000 per year demonstrate that cost of the ionomer will continue to be a major cost contributor to fuel cell power plants relative to the platinum required. Furthermore, the presence of the PFSA™ fluorine-containing polymer in the fuel cell recycle stream greatly complicates conventional recycling methods, which are ill suited due to the toxic and corrosive HF gas released during these processes. The present disclosure thus contemplates processes that enable the extraction and reuse of both the precious metals and the ionomer in current fuel cell components by recovering the platinum group metals in an environmentally benign manner as well as the valuable PFSA™.

Furthermore the present disclosure presents techniques that can be used to recover and separate the PFSA™ ionomer from the end-of-life fabric reinforced perfluorosulfonic acid polymer industrial membranes, such as Chlor-alkali membranes.

In certain embodiments, the disclosure includes processes that allow for the re-manufacture of new catalyst coated membranes (CCMs) from used CCMs extracted from failed fuel cell stacks. This may be accomplished by removing the CCM from the stack, decontaminating the CCM to remove impurities, and then dissolving the ionomer component of the CCM to form a slurry of dissolved PFSA™ together with the Pt/C catalyst particles. The dissolution may, in certain embodiments, be done at increased pressure in an autoclave, for example. Preferred embodiments include a pressure of from 500 to 2000 psi. These two valuable ingredients are then separated, allowing the PFSA™ solution to be reprocessed into a new fuel cell membrane. Ideally the recovered catalyst (Pt/C) is redeposited on the re-manufactured membrane so that a completely re-manufactured CCM is the final result. The same process would be used for an end-of-life Chlor-alkali membrane where the separation of the fiber reinforcement and other solids are separated by similar methods.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

The figure is a diagram of an embodiment of methods of recycling used membrane electrolyte assemblies.

DETAILED DESCRIPTION

In certain preferred embodiments, a recycling process as shown in the figure may be used. The first step in the process involves the decontamination of the used membrane electrolyte assembly (MEA). This is followed by dissolution of the catalyst coated membrane (CCM) in a water aqueous solvent mixture which may comprise from about 20% to about 90% by weight of water and from about 10% to about 80% of methanol, ethanol, n-propanol, isopropanol, n-butanol, 2-butanol, 2-methoxyethanol, 2-ethoxyethanol, ethylene glycol dimethyl ether, ethylene glycol diethyl ether, diethylene glycol dimethyl ether, diethylene glycol diethyl ether, dioxane, acetonitrile or combinations of any thereof, optionally using an autoclaving process at pressure of from 500 to 2000 psi, and temperatures from about 190° to 290° C. In certain preferred embodiments, the mixture comprises a ratio of 160 grams of water, 25 grams of normal propanol, and 42 grams of polymer with approximately 10 grams of Pt/C. The autoclave process may be a batch or continuous process. The pulp resulting from the autoclave procedure is then coarse filtered to remove foreign matter. It has also been discovered that when Kapton®, a polyimide electrical insulating film used as a framing material is present, it remains as strips after the autoclave step and is easily removed and recovered after the autoclave run.

EXAMPLE 1

In the embodiment shown in the figure, a centrifuge is used for separation of pigment from the PFSA™ solution.

In this example of a preferred method, cut un-used catalyst coated membranes were autoclaved. The composition of the materials was

| | |
|---|---|
| NAFION ® | 42.15 gm |
| Pt/C | 9.55 gm |
| Kapton | 1.3 gm |
| Total | 53 gm |

A standard solution making procedure was used that resulted in a low viscosity solution by autoclaving. The resulting mixture behaved as a typical catalyst/NAFION® solution ink as used in the manufacturing processes. During the processing, the stirrer and reactor head were covered with a black "ink"-like material. This material was collected into the total recovered batch from the autoclave with a water rinse. A total of 473 grams was recovered and separated by centrifugation.

In order to demonstrate the efficacy of the separation process, a Sorvall SS-3 Automatic Super-Speed centrifuge was used. The centrifuge has a controllable speed, and at its maximum rated speed of 18,000 rpm, it generates centrifugal forces of about 40,000×g. A rotor capable of holding up to 8 tubes (29.3×105 mm) was used. One pair of centrifugation tubes was filled with 40.3 g each of a 6.5% NAFION® solution with an "H" type micelle structure; and a second pair with 39.4 g each of a 5.0% NAFION® solution with an "L" type micelle structure. All 4 tubes were centrifuged at 15,000 rpm for 90 minutes. A pipette was used to take 5 ml samples from the very top and very bottom of the tubes after centrifugation. The samples were evaporated to dryness to determine the % NAFION®:
"H" Type: Top 6.56%; Bottom 6.53%
"L" Type: Top 4.96%; Bottom 5.02%

Next a composition of catalyst (Pt/C) and NAFION® solution containing about 5% NAFION® and 5% of Engelhard Selectra F5012 50 wt % Pt on Carbon was prepared. This mixture was well mixed by ball milling for 2 hours. The mixture was first centrifuged at slow speeds (5000 rpm), and most of the pigment separated as a thick sediment at these modest speeds. However, enough pigment to render the liquid phase opaque remained dispersed and required a speed in excess of 10,000 rpm to obtain a totally clear liquid phase. It is likely that this second fraction of pigment contains little or no platinum. These samples are being evaluated to determine the catalytic properties of this recovered material.

From these studies, the present inventors concluded that centrifugation has essentially no effect on the NAFION® particle distribution under aggressive high G force centrifugation. This supports the efficacy of this method, since it indicates that the NAFION® does not settle to the bottom upon centrifugation. They also conclude that centrifugation was very successful in separating the Pt/C solids from the NAFION® component in a prepared mixture of Pt/C and NAFION® solution.

EXAMPLE 2

A 70 gram sample of the recovered autoclave discharge was centrifuged and then rinsed further in a second centrifuge step. The resulting wet pigment cake weighed 3.3 gm and the estimated composition was:

| | |
|---|---|
| NAFION ® | unknown, target to be 0 |
| Pt/C | 1.4 gm (dry estimated) |
| Solvent | 1.9 gm (estimated) |
| Total | 3.3 gm |

EXAMPLE 3

23 grams of catalyst coated membranes (9 pieces of 300 cm²) were autoclaved and centrifuged so that a catalyst powder was recovered and 500 ml of NAFION® solution was recovered. Of the 2.25 grams of catalyst powder that was recovered, 10% NAFION® remained, or 0.22 grams NAFION® of the 20.75 grams of NAFION® that was in the original samples. Thus the efficiency of recovery of the NAFION® is 98.9% of the original amount of NAFION®; recovered in a re-usable form as a 500 ml, 5 wt % clear NAFION® solution.

EXAMPLE 4

Forty eight used membrane electrolyte assemblies (MEAs) were obtained from an end-of-life 500 Watt Avista fuel cell system. The performance of the system had degraded to the point that it would no longer start. The membranes were manually separated by Drexel from the system and sent to the inventors. The Ionomer was extracted by a dissolution process from a set of 5 MEAs, and the resulting supporting structure of e-PTFE, typical of the GORE-SELECT membrane was easily filtered out. A film of pure ionomer was cast and the ionomer tested for ion-exchange-capacity. The film contained 1030 EW (grams polymer/mole ion-exchange). This value is typical of the ion-exchange-capacity of new ionomer, indicating the performance of the ionomer is not significantly degraded during its operating life.

New MEAs were produced for re-build into the system. The MEAs materials were re-assembled into the fuel cell re-using all other components; i.e. seals, gas diffusion layers, etc. The system was started and performance was similar to the as-received system performance.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents which are chemically or physically related may be substituted for the agents described herein while the same or similar results would be achieved. All such similar substitutes and modifications apparent to those skilled in the art are deemed to be within the spirit, scope and concept of the invention as defined by the appended claims.

The invention claimed is:

1. A process for separation of components of catalyst coated membranes comprising:
    dissolving the catalyst coated membranes into a slurry of water and solvent;
    subjecting the slurry to a temperature of from 190° C. to 290° C. at a pressure of from 500 to 2000 psi for an effective period of time to obtain a pulp material;
    filtering the pulp material; and
    separating the components from the filtrate to obtain a first portion containing at least a majority of the catalyst and a second portion containing the membrane material.

2. The process of claim 1, wherein the slurry of water and solvent comprises a ratio of 160 grams of water to 25 grams of normal propanol.

3. The process of claim 1, wherein the filtrate is separated by centrifugation.

4. The process of claim 1, wherein the first portion is a wet pigment cake.

5. The process of claim 1, wherein the catalyst comprises Pt.

6. The process of claim 1, wherein the catalyst is Pt/C.

7. The process of claim 1, wherein the membrane is a fluorine-containing polymer.

8. The process of claim 1, wherein the membrane is a perfluorosulfonic acid polymer membrane.

9. The process of claim 1, wherein the slurry of water and solvent comprises from about 20% to about 90% by weight of water and from about 10% to about 80% of methanol, ethanol, n-propanol, isopropanol, n-butanol, 2-butanol, 2-methoxyethanol, 2-ethoxyethanol, ethylene glycol dimethyl ether, ethylene glycol diethyl ether, diethylene glycol dimethyl ether, diethylene glycol diethyl ether, dioxane, acetonitrile or combinations of any thereof.

10. The process of claim 1, wherein the membrane is a fabric reinforced perfluorosulfonic acid polymer membrane.

11. A method for recovering used perfluorosulfonic acid membranes comprising:
    obtaining a slurry of water and solvent containing the catalyst coated membranes; subjecting the slurry to a pressure of from 500 to 2000 psi at a temperature of from 190° C. to 290° C. in an autoclave for an effective period of time to obtain a pulp material;
    filtering the pulp material to obtain a filtrate; and
    centrifuging the filtrate to separate the majority of the perfluorosulfonic acid membrane from the remainder of the filtrate; and
    recovering the perfluorosulfonic acid membrane material.

12. A method of recycling a used catalyst coated membrane material comprising fluorine containing polymer membrane and metal catalyst, comprising:
    decontaminating the used catalyst coated membrane to remove impurities;
    dissolving the used catalyst coated membrane in water and a solvent to form a slurry of dissolved fluorine containing polymer membrane together with the metal catalyst particles;
    subjecting the slurry to a temperature of at least 190° C. and pressure of at least 500 psi;
    separating the fluorine containing polymer membrane material from the metal catalyst;
    recovering the fluorine containing polymer membrane material and the metal catalyst and casting the recovered fluorine containing polymer membrane material into a recycled membrane.

13. The method of claim 12, wherein the used catalyst coated membrane is extracted from a fuel cell stack.

14. The method of claim 12, wherein the fluorine containing polymer membrane material is perfluorosulfonic acid polymer membrane.

15. The method of claim 12, wherein the metal catalyst comprises Pt.

16. The method of claim 12, wherein the metal catalyst is Pt/C.

17. The method of claim 12, wherein the recovered metal catalyst is redeposited on the recycled membrane.

18. The method of claim 12, wherein the membrane is a fabric reinforced perfluorosulfonic acid polymer membrane.

19. A process for separating components of a composite material containing perfluorosulfonic acid polymer material and non-perfluorosulfonic acid polymer material, said process comprising:
    subjecting the composite material to a temperature of at least 200° C. in water and solvent for a time effective to form a suspension of the perfluorosulfonic acid polymer material and non-perfluorosulfonic acid polymer material in a liquid composition, wherein the suspension is formed under a pressure of from 500 to 2000 psi; and
    separating the non-perfluorosulfonic acid polymer material from the liquid composition.

20. The process of claim 19, wherein the non-perfluorosulfonic acid polymer material is separated from the liquid composition by centrifugation.

21. The process of claim 19, wherein the composite material is a fabric reinforced perfluorosulfonic acid polymer membrane.

22. The process of claim 19, wherein the composite material is a fuel cell catalyst coated membrane.

23. The process of claim 19, wherein the acid water solvent comprises from about 20% to about 90% by weight of water and from about 10% to about 80% of methanol, ethanol, n-propanol, isopropanol, n-butanol, 2-butanol, 2-methoxyethanol, 2-ethoxyethanol, ethylene glycol dimethyl ether, ethylene glycol diethyl ether, diethylene glycol dimethyl ether, diethylene glycol diethyl ether, dioxane, acetonitrile or combinations of any thereof.

* * * * *